No. 888,673. PATENTED MAY 26, 1908.
C. B. VAN HORN.
WHEEL.
APPLICATION FILED JUNE 16, 1905.
2 SHEETS—SHEET 2.
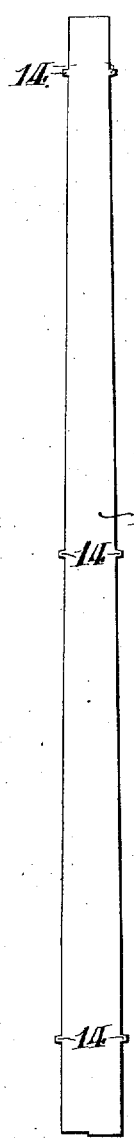
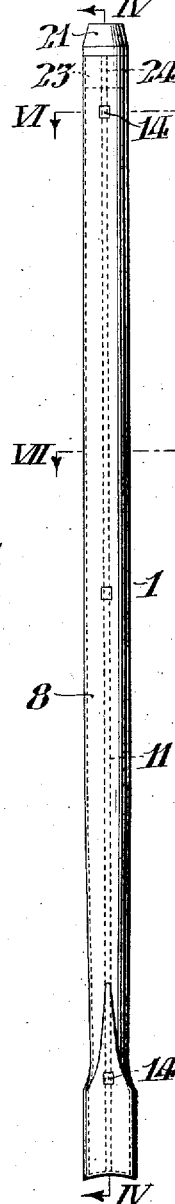
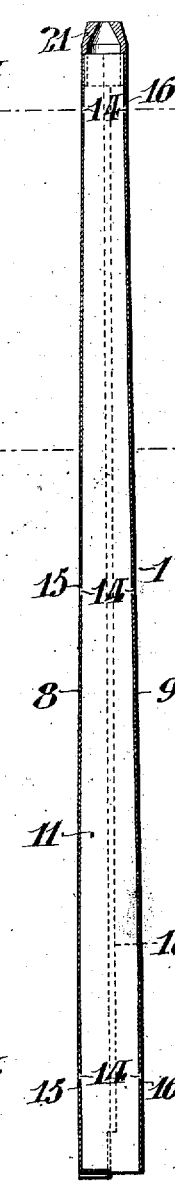
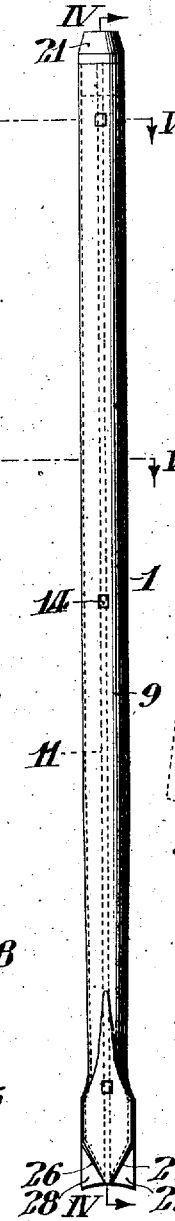
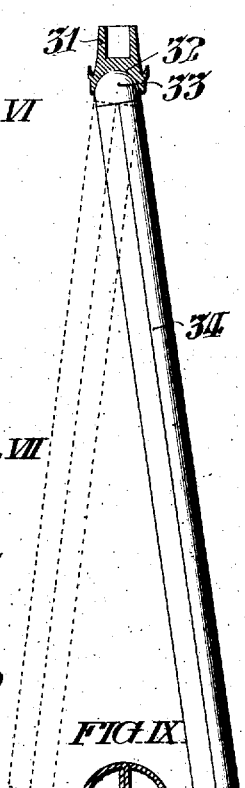
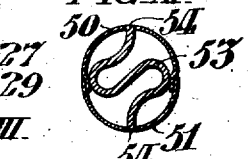
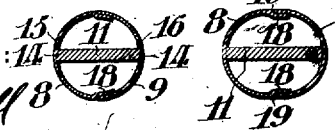
WITNESSES:
Clifton C. Hallwell
John C. Bergner
INVENTOR:
CHARLES B. VAN HORN,
by Paige, Paul & Foster
Attys.

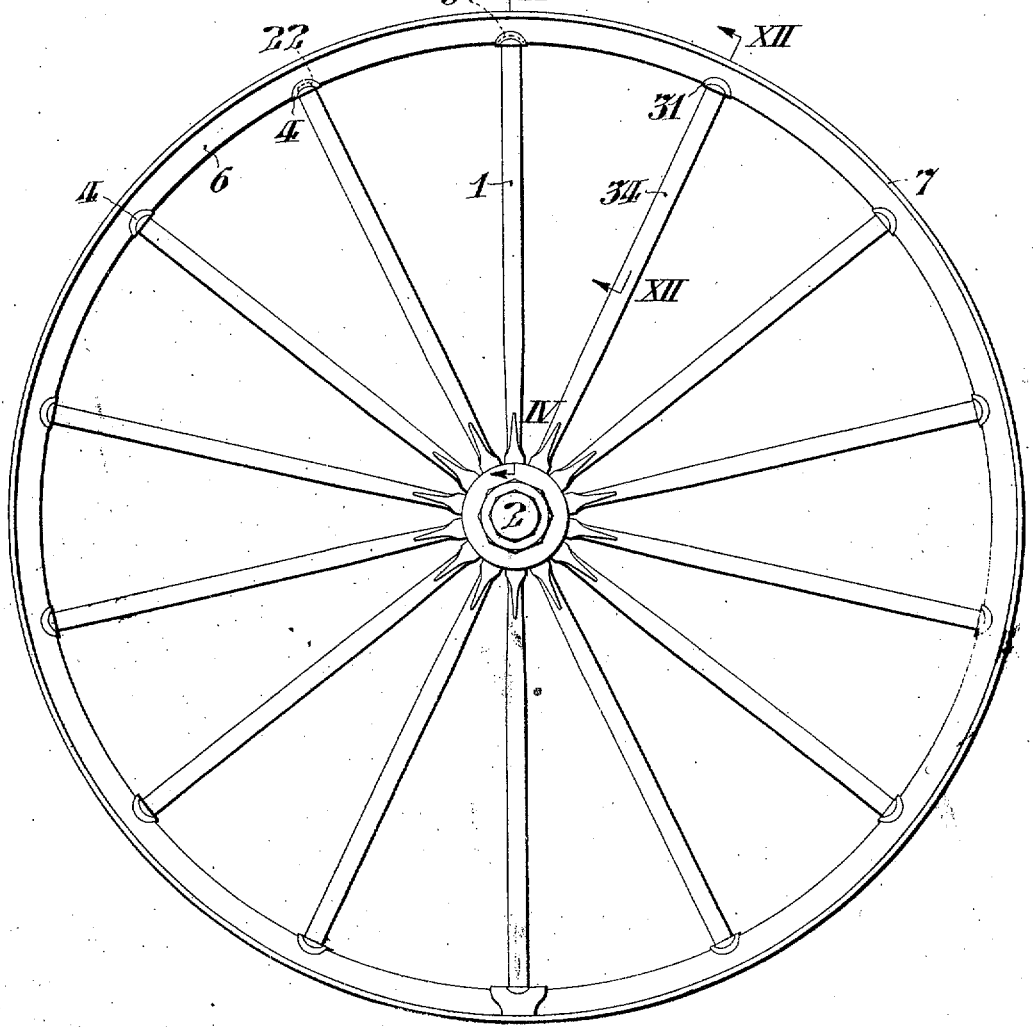

UNITED STATES PATENT OFFICE.

CHARLES B. VAN HORN, OF PHILADELPHIA, PENNSYLVANIA, ASSIGNOR, BY DIRECT AND MESNE ASSIGNMENTS, TO GUARANTEE TITLE AND TRUST CO., TRUSTEE, OF PITTSBURG, PENNSYLVANIA, A CORPORATION OF PENNSYLVANIA.

WHEEL.

No. 888,673.  Specification of Letters Patent.  Patented May 26, 1908.

Application filed June 16, 1905. Serial No. 265,507.

*To all whom it may concern:*

Be it known that I, CHARLES B. VAN HORN, of Philadelphia, in the State of Pennsylvania, have invented certain new and useful Improvements in Wheels, whereof the following is a specification, reference being had to the accompanying drawings.

My improvements may be advantageously employed in wheels particularly adapted for use upon vehicles, and comprises a metallic spoke of peculiar construction, and a spoke socket fitted to coöperate with said spoke and arranged to engage a felly.

The form of my invention hereinafter described comprises a spoke having a casing formed of primarily separate sections whose edges are joined in a plane or planes extending longitudinally with respect to the spoke, and which casing incloses a stiffening web extending longitudinally therein. As described said web may be provided with unitary lugs which are riveted through openings in the respectively opposite casing sections and serve to hold them in rigid relation; and the joints in the casing may be brazed. Said spoke may be conveniently formed smaller at one end than at the other, and have at its smaller end a spheroidal tip or bushing fitted to a corresponding spheroidal recess in a spoke socket arranged to engage a felly; such an arrangement permitting the oscillatory adjustment of said spoke on a center common to said spheroidal tip and socket recess.

My invention also includes a spoke of the character above contemplated having at its larger end a wedge and shoulders projecting transversely with respect to said wedge, so that when such spokes are fitted in a hub with their shoulders alternately opposite, they support each other by the overlapping engagement of said shoulders and wedges in the manner set forth in Letters Patent of the United States No. 693,929, granted to me February 25th, 1902.

As hereinafter described the stiffening webs aforesaid may be formed by complementary flanges extending inwardly from the opposite sections of the casing, and said flanges may be interengaged to determine the proper position of said sections in assembling them.

My invention comprises the various novel features of construction and arrangement hereinafter more definitely specified.

In the drawings, Figure I, is a side elevation of a wheel conveniently embodying my invention. Figs. II, and III, are respectively opposite elevations of the upper vertically disposed spoke shown in Fig. I. Fig. IV, is a sectional view of said spoke taken on the line IV, IV, in Figs. I, II, and III. Fig. V, is an elevation of a stiffening web, like that shown riveted in Fig. IV, but with its rivet lugs in their primary shape. Fig. VI, is a transverse sectional view of said spoke, taken on the line VI, VI, in Figs. II, III, and IV, but on a larger scale. Fig. VII, is a transverse sectional view of said spoke, taken on the line VII, VII, in Figs. II, III, and IV, but on a larger scale. Fig. VIII, is an elevation of the larger end of said spoke, being the lower end in Figs. II, III, and IV, but on a larger scale. Figs. IX, X, and XI, are transverse sectional views of spokes showing modifications of my invention. Fig. XII, is a sectional view of a spoke socket, taken on the line XII, XII, in Fig. I, but on a larger scale, having a spheroidal recess to receive the correspondingly shaped tip of a spoke and indicating the oscillatory adjustment of said spoke in said socket.

The wheel shown in Fig. I, comprises the spokes 1, fitted at their larger inner ends in the hub 2, which may be of the expansible construction shown in my Letters Patent of the United States #693,929, above mentioned. The outer smaller ends of said spokes 1, are respectively fitted in spoke sockets 4, which are conveniently fitted in corresponding recesses 5, in the felly 6, the latter being provided with the rim 7.

Referring to Figs. II, to VIII, inclusive, the spoke 1, comprises an exterior casing formed of opposite complementary primarily separate sections 8, and 9, which embrace within them the longitudinally extending stiffening web 11, the plane of which is radial to the axis of the wheel shown in Fig. I. As indicated in Fig. V, said web 11, comprises oppositely extending rivet lugs 14, which are primarily smaller at their free ends than the openings 15, and 16, respectively provided for them in said spoke casing sections 8, and 9. As shown in Fig. IV, where the members of the spoke are assembled, said lugs 14, are riveted in engagement with the openings 15, and 16, so as to hold the spoke casing members 8, and 9, in rigid relation. Said sections are also preferably brazed at their joints.

As shown in Figs. VI, and VII, the spoke casing section 8, is conveniently provided with longitudinal flanges 18, which extend within and engage the free edges of the spoke casing section 9; the edges of the latter abut against the shoulders 19, adjoining said flanges 18.

As shown in Figs. II, III and IV; said spoke 1, is provided with the bushing tip 21, at its smaller end, having a conical exterior surface fitted to a corresponding recess 22, in the socket 4, as indicated in Fig. I. Said bushing 21, is conveniently provided with the flange 23, extending within the spoke casing members 8, and 9, and having recesses 24, embracing said web 11. The opposite larger end of said spoke 1, comprises a wedge formed by the opposite walls 26, and 27, which converge toward the web 11, as best shown in Figs. III, and VIII, and said wedge end of the spoke is provided with shoulders 28, and 29, extending transversely with respect to said web and said wedge; the arrangement being such that when similar spokes having their faces presented alternately in opposite directions (as in Figs. II, and III,) are assembled in a wheel as in Fig. I, said wedges and shoulders overlap and interengage each other, so as to present a substantially continuous cylindrical surface at their inner ends for engagement with an expanding device in the hub 2, which is arranged to thrust them outwardly into engagement with the spoke sockets 4, in the felly 6.

The conical spoke tips 21, are adapted to make tight joints in the sockets 4, and are preferably employed in wheels where it is not desired to afford means for permitting oscillatory adjustment of the spokes in the direction of the axis of the wheel. However, I find it convenient to provide spokes and sockets which permit such adjustment, as indicated in Fig. XII, wherein the socket 31, is similar in other respects to the sockets 4, but comprises a spheroidal recess 32, fitted to the spheroidal bushing tip 33, on the spoke 34; the arrangement being such that said spoke may be adjusted from the position shown in full lines to the position shown in dotted lines in Fig. XII. It is to be understood that such construction permits the extreme staggered arrangement of the spokes desired for some types of wheels, and without any structural difference in the alternate series of spokes or in the spoke sockets in which they are respectively fitted.

Although I find it convenient to form the stiffening web 11, primarily separate from the spoke casing members 8, and 9; it is to be understood that stiffening webs may be formed in unitary relation with the exterior casing. For instance, as indicated in Fig. IX, the respectively opposite spoke sections 36, and 37, are not only complementary but counterparts of each other, each being provided with respectively opposite flanges 39, and 40, arranged for interengagement as indicated. It is to be understood that said flanges determine the proper position of engagement of said spoke sections with each other and thus facilitate the assembling operation, said sections being finally secured together by brazing the joints between said flanges.

It may be observed that the construction described with respect to Fig. IX, is like that shown in Figs. VI, and VII, in that the stiffening webs constituted by the flanges 39, and 40, are coextensive with the diameter of the spoke casing, like the web 11, above described. However, stiffening webs which are not thus coextensive with the diameter of the spoke may be formed as shown in Fig. X, wherein the opposite spoke members 42, and 43, are complementary and counterpart, like the spoke members 36, and 37, above described, but have their web flanges 44, and 45, of less radial extent.

It may be observed that all of the forms of spokes above described comprise stiffening ribs which brace the spoke internally in but one direction. However, it is to be understood that stiffening ribs of other forms may be employed such as to brace the spoke internally in different directions; for instance, in the form of my invention shown in Fig. XI, the opposite casing members 50, and 51, are held together by the web 53, provided with rivet lugs 54, like the lugs 14, on the plane web 11, shown in Figs. IV, and V, but said web 53, is of such configuration as to brace the spoke in directions at right angles to each other.

I do not desire to limit myself to the precise details of construction and arrangement above described as it is obvious that various modifications may be made therein without departing from the essential features of my invention.

I claim:—

1. In a spoke, a casing comprising primarily separate sections and a stiffening web within said casing; said casing being smaller at one end than at the other and having a spheroidal bushing at its smaller end, substantially as set forth.

2. In a spoke, a casing comprising primarily separate sections and a stiffening web within said casing; said casing being smaller at one end than at the other and having a bushing at its smaller end, comprising a flange fitted within said casing with recesses embracing said web, substantially as set forth.

3. In a spoke, a casing comprising primarily separate sections and a stiffening web within said casing; said casing being smaller at one end than at the other and having a spheroidal bushing at its smaller end; a spoke socket having means arranged to engage a felly and comprising a spheroidal recess arranged to receive said spheroidal bushing and permit the oscillatory adjustment of said spoke on a center common to said spheroidal bushing and recess, substantially as set forth.

4. In a spoke, a casing comprising primarily separate sections and a stiffening web within said casing; said casing being larger at one end than at the other, and having opposed plane converging walls forming a wedge at its larger end; and plane parallel walls adjoining said converging walls in parallel relation with its axis of rotation, and arranged to abut against the respective converging walls of similar spokes, substantially as set forth.

5. In a spoke, a casing comprising primarily separate sections connected by a stiffening web within said casing, extending transversely to the plane of division of said sections; said casing being larger at one end than at the other and having opposed plane walls converging toward said web, and forming a wedge at its larger end, substantially as set forth.

6. In a spoke, a casing comprising primarily separate sections and a stiffening web within said casing; said casing being larger at one end than at the other, having opposed converging walls forming a wedge at its larger end, and having shoulders projecting beyond said wedge walls, substantially as set forth.

7. In a spoke, a casing comprising primarily separate sections and a stiffening web within said casing; said casing being smaller at one end than at the other and having opposed walls converging toward said web and forming a wedge at its larger end, and shoulders extending beyond said wedge in transverse relation to said web, substantially as set forth.

8. In a spoke, a casing comprising primarily separate sections and a stiffening web within said casing; and, means rigidly connecting said web and casing comprising lugs extending from said web through respective openings in said casing; said lugs being riveted in engagement with said casing, substantially as set forth.

9. In a spoke, a casing comprising primarily separate sections and a stiffening web within said casing; and means rigidly connecting said web and casing, comprising lugs extending from said web in unitary relation therewith, having heads riveted in openings in said casing, substantially as set forth.

In testimony whereof, I have hereunto signed my name, at Philadelphia, Pennsylvania, this 14th day of June, 1905.

CHARLES B. VAN HORN.

Witnesses:
JAMES H. BELL,
CLIFTON C. HALLOWELL.